United States Patent [19]

Zollinger

[11] 4,270,036
[45] May 26, 1981

[54] DEVICE FOR WELDING TOGETHER TWO BARS ON THEIR FRONT SIDES

[75] Inventor: Hans-Rudolf Zollinger, Geroldswil, Switzerland

[73] Assignee: H. A. Schlatter AG, Zurich, Switzerland

[21] Appl. No.: 87,665

[22] Filed: Oct. 24, 1979

[30] Foreign Application Priority Data

Nov. 10, 1978 [CH] Switzerland ............... 11567/78

[51] Int. Cl.³ .................. B23K 11/32; B23K 37/04
[52] U.S. Cl. ............................ 219/53; 219/101; 219/161; 228/49 R
[58] Field of Search ................. 219/53, 54, 55, 97, 219/100, 101, 104, 161; 228/49 R, 49 A, 212

[56] References Cited

U.S. PATENT DOCUMENTS

| 2,250,870 | 7/1941 | Jones et al. | 219/104 |
| 3,541,295 | 11/1970 | McGuire | 219/101 |
| 3,925,636 | 12/1975 | Coleman | 219/101 X |
| 3,982,091 | 9/1976 | Zollinger | 219/101 |

FOREIGN PATENT DOCUMENTS 2003780 3/1979 United Kingdom ............... 219/161
2009304 6/1979 United Kingdom ............... 219/161

Primary Examiner—Elliot A. Goldberg
Assistant Examiner—Keith E. George
Attorney, Agent, or Firm—Jakala, Knechtel, Valentino, Demeur & Dallas

[57] ABSTRACT

A welding apparatus including, generally, a vertical clamping assembly having an upper and a lower clamping assembly for each of two rail sections to be welded together. These vertical clamping assemblies clamp and vertically align the running surfaces of the two rail sections, by establishing the running surfaces at a predetermined stop level. The welding apparatus also includes a horizontal centering and aligning apparatus which has a first pair of clamping arms which engage the rail base and pre-center the rail sections with respect to one another and to the welding apparatus. The apparatus also includes a pair of spaced apart clamping arms associated with each of the rail sections which are operable to both laterally clamp the rail heads of the respective rail sections and to horizontally or laterally align the rail sections with respect to one another. Once aligned, the ends of the rail sections are welded together.

11 Claims, 6 Drawing Figures

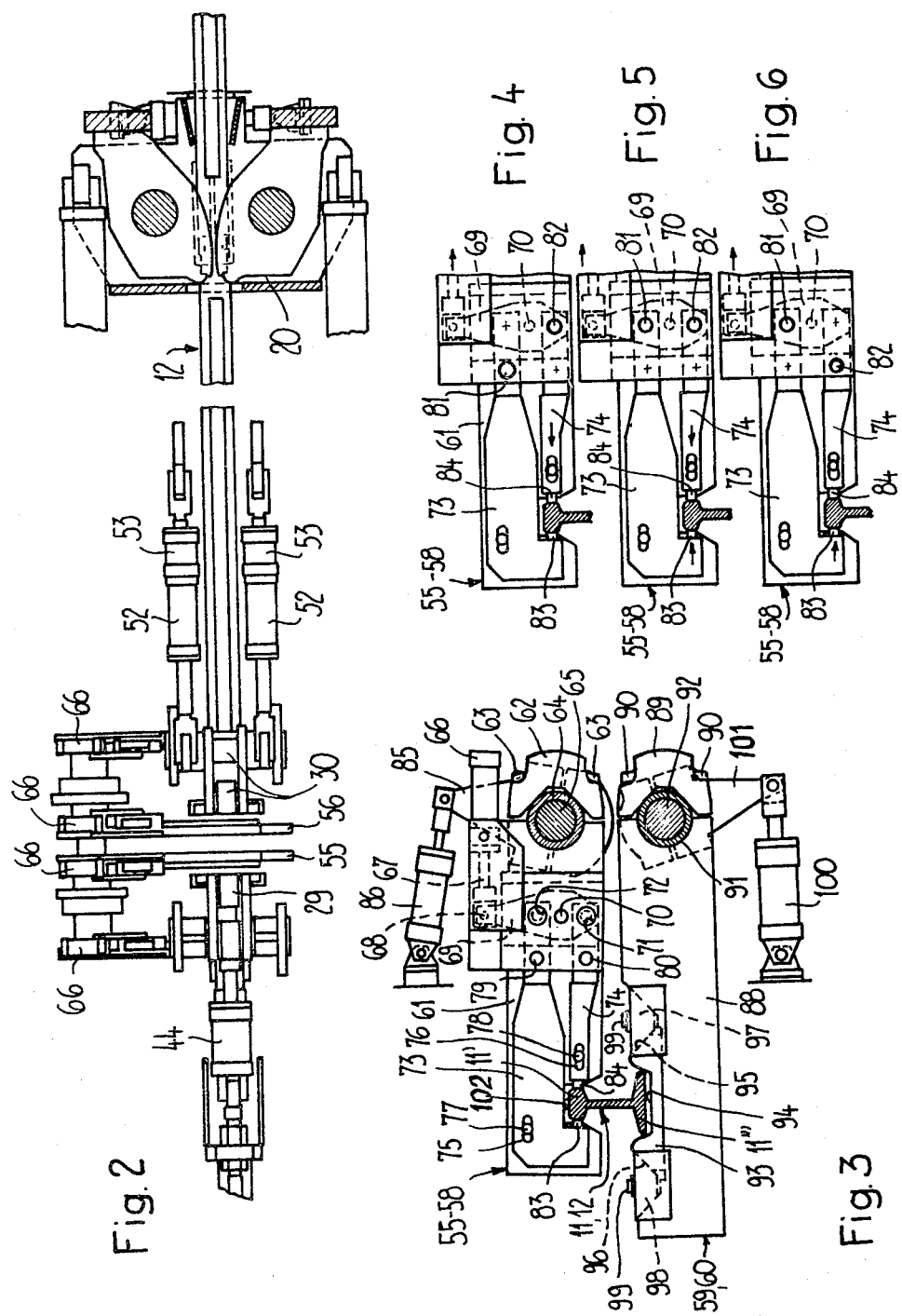

DEVICE FOR WELDING TOGETHER TWO BARS ON THEIR FRONT SIDES

BACKGROUND OF THE INVENTION

This invention relates, in general, to a new and improved welding apparatus for forming a continuous rail and, in particular, to a new and improved welding apparatus for welding rail sections together to form a continuous rail.

Welding apparatus for welding together rail sections and other similar materials are generally well-known in the art. Various welding apparatus of this type is disclosed, for example, U.S. Pat. Nos. 3,982,091; 2,781,026; 2,787,698 and 3,134,012.

While the welding apparatus disclosed in these prior patents have been used to weld rail sections together successfully, they also have been found to be in need of improvements in that, in a number of cases, a number of unsatisfactory welds which must be corrected by severing the joint and making a new weld result. Obviously, the production of improper welds increases both the time required and the cost of production of the rail.

The welding apparatus disclosed in the above-mentioned U.S. Pat. No. 3,982,091, which is assigned to the assignee of the present application, comprised many improvements and overcome many of the shortcomings of the previously existing apparatus. The welding apparatus functions exceedingly well in welding together most rail sections.

Generally, when welding together new rail sections and most old, used rail sections, no particular difficulties are encountered in aligning the ends of these rail sections and welding them together. However, since the improvements in the welding apparatus now permit the welding of these old, used rail sections, it is now found that there is a demand or desire to weld some old, used rail sections which have end portions which are considerably distorted, i.e., the end portions of the rail sections are twisted so that they are not straight with respect to either the longitudinal and/or vertical axis of the rail sections. Normally, it is required that rail sections be reasonably straight along a substantial length, approximately 10 feet, from the end of the rail section, in order for the rail sections to be properly aligned and welded. When welding rail sections of this type, i.e., those with the distorted end portions, considerable difficulties are encountered in aligning the ends of these rail sections so that a good weld or, more importantly, a good welded joint which is straight, is provided.

Accordingly, it is an object of the present invention to provide a new and improved welding apparatus for forming a continuous rail.

In particular, it is an object to provide welding apparatus of the described type having alignment means for aligning the end portions of rail sections, so that now rail sections having distorted end sections can be more easily aligned and welded, with a resulting welded joint which is straight.

SUMMARY OF THE INVENTION

The above objectives, as well as others not specifically mentioned, are provided by the welding apparatus of the present invention, which welding apparatus is generally of the same construction and functions in substantially the same fashion as the welding apparatus disclosed in the above-mentioned U.S. Pat. No. 3,982,091. Reference, therefore, can be made to the disclosure therein for a description of the overall structure and operation of the welding apparatus, particularly as it relates to the hydraulic and electrical systems thereof. Also, while the clamping systems, in most cases, are generally of the same or similar construction, the vertical clamping system and, in particular, the horizontal aligning and clamping system, have been substantially improved, all as fully described below.

More particularly, the welding apparatus includes, generally, a vertical clamping assembly including an upper and a lower clamping assembly for each of the respective rail sections to be welded together. These vertical clamping assemblies clamp and vertically align the running surfaces of the two rail sections, by establishing the running surfaces at a pre-determined stop level. The welding apparatus now also includes a horizontal centering and aligning apparatus which includes a first pair of clamping arms which engage the rail base and pre-center the rail sections with respect to one another and to the welding apparatus. The apparatus also icludes a pair of spaced apart clamping armss associated with each of the rail sections which are operable to both clamp the rail heads of the respective rail sections and to horizontally or laterally align the rail sections with respect to one another. Once aligned, the ends of the rail sections are welded together, with the alignment forces being applied to retain the alignment of the rail sections until the weld joint is established. In this fashion, any tensions which originate from possible defects in the longitudinal length of the rail sections, particularly along the lengths thereof between the respective pairs of spaced-apart clamping arms, are kept away from the weld joint.

BRIEF DESCRIPTION OF THE DRAWINGS

For a fuller understanding of the nature and objects of the invention, reference should be had to the following detailed description taken in connection with the accompanying drawings, in which:

FIG. 2 is a top view, partly cut, of the welding apparatus of FIG. 1;

FIG. 3 is a sectional view generally taken along lines A-A of FIG. 1; and

FIGS. 4-6 are partial side plan views illustrating the centering device in three different operational settings.

Similar reference characters refer to similar parts throughout the several views of the drawings.

DESCRIPTION OF THE EMBODIMENT

Figure 1:
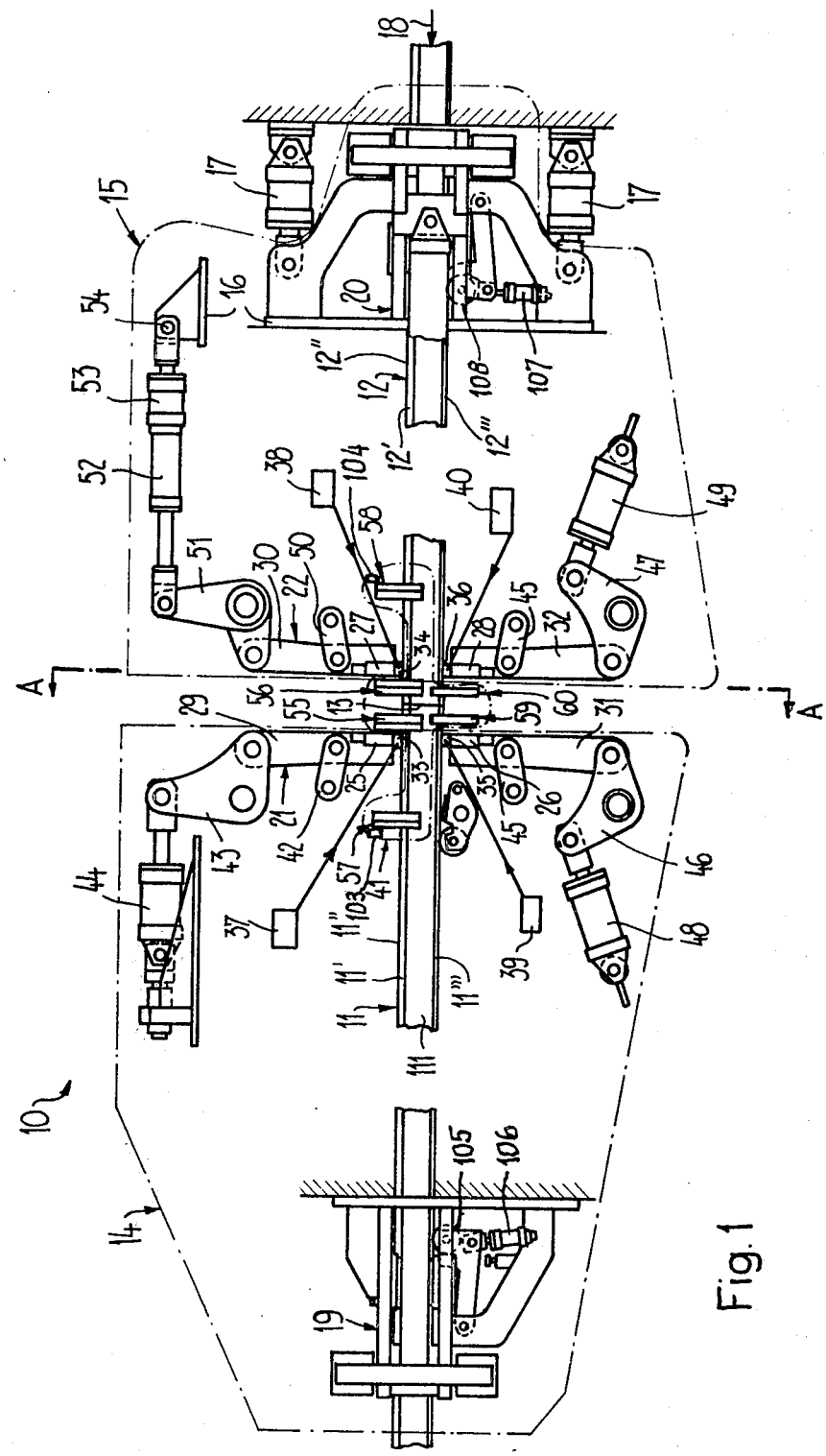
FIG. 1 is a side-plan view, greatly simplified, of welding apparatus exemplary of the invention.

Referring now to the drawings, a welding apparatus 10 for welding together two rail sections 11 and 12 to provide a welded joint 13 between them is generally illustrated. The welding apparatus 10 includes various clamping assemblies 14 (which as a whole are encompassed by the dash-dotted line 14) associated with the continuous rail 11, and these clamping assemblies 14 are fixedly secured to a fixed frame (not shown) of the welding apparatus. Similar clamping assemblies 15 (which as a whole are encompassed by the dash-dotted line 15) are associated with the rail section 12 to be welded to the continuous rail 11. These clamping assemblies 15 are supported by a carriage frame which is not shown but is generally indicated by the reference numeral 16, that is longitudinally movable with respect to the fixed frame, by means of hydraulic cylinders 17.

These hydraulic cylinders 17, during the welding operation, exert an upsetting force acting in the direction of the arrow 18 on the rail sections 12. The clamping assemblies 14 and 15 each includes a horizontal or web clamping assembly 19 and 20, respectively, which acts on the rail web 111, and a vertical clamping assembly 21 and 22, respectively, which acts on the rail head or runniung surface 11″ and the rail base 11‴. In this respect, the welding apparatus 10 is generally of the same construction and operation as the welding apparatus disclosed in the above-mentioned U.S. Pat. No. 3,982,091, except as more specifically described below.

The vertical clamping assemblies 21 and 22 each comprise an upper and lower clamping assembly which act on the running surface 11″ and the rail base 11‴, respectively, to vertically clamp and align the respective rail sections 11 and 12. The upper clamping assembly of the vertical clamping assembly 21 includes a hydraulic cylinder 44 which functions as a stop press and to which is coupled pairs of spaced apart lever arms 43, 29 and 42. An electrode 33 is affixed between the ends of the lever arms 29, and engages the running surface 11″ of the rail section 11 to clamp and align the rail section 11 when the hydraulic cylinder 44 is actuated. These lever arms 43, 29 and 42 all are pivotally linked such that a substantially vertical movement of the electrode 33 results, i.e., the electrode 33 is raised and lowered in a substantially vertical plane during actuation of the hydraulic cylinder 44.

The lower clamping assembly of the vertical clamping assembly 21 is generally of a like construction, and includes a hydraulic cylinder 48 which functions as a clamping press and to which is coupled pairs of spaced apart lever arms 46, 31 and 45. An electrode 35 is affixed between the ends of the lever arms 31, and engages the rail base 11‴ of the rail section 11 to clamp and align the rail section 11 when the hydrualic cylinder 48 is actuated. These lever arms 46, 31 and 45 likewise are linked such that the electrode 35 is raised and lowered in a substantially vertical plane, during actuation of the hydraulic cylinder 48.

The vertical clamping assembly 22 associated with the rail section 12 is generally of a like construction and includes an upper and lower clamping assembly. The upper clamping assembly includes a pair of hydraulic cylinders 52 which function as stop presses and a pair of hydraulic cylinders 53 which are coupled with the hydraulic cylinders 52 and to the carriage frame 16 by pivotal links 54. These hydraulic cylinders 53 function as adjusting presses, as more particularly described below. Coupled to each of the hydraulic cylinders 52 are lever arms 51, 30 and 50, and an electrode 34 is affixed between the ends of the lever arms 30. The electrode 34 engages the running surface 12″ of the rail section 12 to clamp and align the rail section 12 when the hydraulic cylinders 52, and 53, are actuated.

The lower clamping assembly includes a pair of hydraulic cylinders 49 which function as clamping presses and to which are coupled spaced apart pairs of lever arms 47, 32 and 45. An electrode 36 is affixed between the ends of the lever arms 32, and engages the rail base 12‴ when the hydraulic cylinder 49 is actuated.

In addition to these vertical clamping assemblies 21 and 22, the welding apparatus 10 now is further provided with a lateral aligning device 41 (indicated and framed by a broken line in FIG. 1) which includes four clamping arms 55–58 which are disposed generally perpendicular to the length of the rail sections 11 and 12 and which are operable to engage the rail head of the respective rail sections 11 and 12; and two clamping arms 59 and 60 which likewise are disposed generally perpendicular to the rail sections 11 and 12, but which engage the rail base of the rail sections. The clamping arms 55–58, and the clamping arms 59 and 60, are generally of the construction and operation as illustrated in FIGS. 3–6.

In particular, as can be seen in FIGS. 3–6, each of the clamping arms 55–58 includes a plate 61. These plates 61 associated with the respective pairs of clamping arms 55, 57 and 56, 58, at one end thereof, are secured against rotation by means of a clamping piece 62 and bolt 63, to one of a pair of sleeves 64 which are rotatably retained on a shaft 65 which is common to all of the clamping arms 55–58. A pair of crank arms 85 likewise are secured against rotation at one end thereof to the respective ones of the sleeves 64. The pistons of a pair of hydraulic cylinders 86 are coupled to the respective ones of the crank arms 85 at the other ends thereof. Accordingly, the crank arms 55, 57 are pivotally rotated about the shaft 65 when one of the hydraulic cylinders is actuated, and the crank arms 56, 58 are pivotally rotated about the shaft 65 when the other hydraulic cylinder 86 is actuated.

A hydraulic cylinder 66 having a piston rod 67 is associated with each of the clamping arms 55–58, and is affixed to the plate 61. Its piston rod 67 is coupled at 68 with one end of a lever arm 69 which is pivotally affixed at 70 to the plate 61. Two bores 71 and 72 are formed in the plate 61, equally distant from the pivot 70 and diametrically opposite one another.

A clamping jaw 73 which is essentially L-shaped and a clamping jaw 74 which is essentially straight are slidably affixed to the plate 61 by means of guide pins 77 and 78 secured to the plate 61 and disposed within oblong holes 75 and 76, respectively, formed in the respective ones of the clamping jaws 73 and 74. The clamping jaws 73 and 74, at the ends thereof nearest the lever arms 69, each have a bore 79 and 80 formed in them, respectively, which can be aligned with similar bores formed in the plate 61. Each clamping jaw 73 and 74 likewise has a bore formed in it which can be aligned with one of the bores 71 and 72 in the lever arm 69. These bores are provided for coupling the clamping jaw 73 and 74 to the plate 61 and/or the lever arm 69 in a manner described more fully below, by means of coupling pins such as the coupling pins 81 and 82 (FIGS. 4–6).

More particularly, as can be seen in FIG. 4, the clamping jaw 73 is coupled to the plate 61, by means of the coupling pin 81 being extended through the bore 79 and the correspondingly located bore in the plate 69. The clamping jaw 74 in this instance is coupled to the lever arm 69 by means of the coupling pin 82 being extended through the bore in it and the bore 71 in the lever arm 69. With these connections, when the hydraulic cylinder 66 is actuated so that its piston rod moves to the right (in the direction of the arrow), the clamping jaw 74 is moved towards the clamping jaw 73 while the latter remains fixed, being coupled to the plate 61.

In FIG. 5, both of the clamping jaws 73 and 74 are coupled to the lever arm 69, by means of the coupling pins 81 and 82 being extended through the bores 71 and 72 in the plate 61 and the corresponding bores in the clamping jaws 73 and 74. In this case, when the hydraulic cylinder 66 is actuated so that its piston rod 67 moves to the right (in the direction of the arrow), the clamping jaws 73 and 74 move oppositely toward, or away, from one another.

In FIG. 6, the clamping jaw 73 is coupled to the lever arm 69, by means of the coupling pin 81, and the clamping jaw 74 is coupled to the plate 61, by means of the coupling pin 82. In this instance, the clamping jaw 73 moves toward the clamping jaw 74 when the hydraulic cylinder 66 is actuated.

The clamping jaws 73 and 74 also are provided with stops 83 and 84, respectively, which when the clamping jaws are operated clamp against the flanks of the rail head 11' or 12'. In addition, the plates 61 associated with the clamping arms 55 and 56 are provided with stops 97 which are engageable with the top side or running surface 11" and 12"of the rail head, thereby guaranteeing that the clamping jaws 73 and 74 with their stops 83 and 84 always engage at the same level on the flanks of the rail head 11' and 12'.

Accordingly, from the above description, it can be seen that the clamping jaws 73 and 74 can be operated to clamp between them the rail head of the rail sections and, furthermore, can be coupled with the plate 61 and/or lever arm 69 such that the rail sections can be laterally aligned to the left (FIG. 4), to the right (FIG. 6) or toward the plane of symmetry of the rail head (FIG. 5). Therefore, regardless of the manner in which the rail section may be distorted along its length, it can be manipulated by the clamping jaws 73 and 74 to effect a proper alignment of the ends of the rail sections 11 and 12, by coupling the clamping jaws 73 and 74 to the plate 61 and/or lever arm 69, in the manner described above, and as more particularly described below.

Referring again now to FIG. 3, the clamping arms 59 and 60 of the lateral aligning device 41 each include a plate 88 which is clamped against rotation to one of a pair of sleeves 91, by means of clamping pieces 89 and bolts 90. The sleeves 91 are rotatably retained on a shaft 92 which is common to the two clamping arms 59 and 60 and is parallel with the shaft 65, i.e., in the ssame horizontal plane. A base retainer 93 having a recess 94 for receiving therein the rail base 11''' or 12''', is mounted on the plates 88. These base retainers 93 are laterally adjustable by means of the wedge clamps 97 and 98 which are secured to the plate 88 by means of bolts 99 and which engage with the slanted planks 95 and 96 of the base retainers 93. The base retainers 93 are laterally adjustable by loosening and tightening the respective ones of the bolts 99, to raise or lower the wedge clamps 97 and 98.

A crank arm 101 is associated with each of the clamping jaws 59 and 60 and is secured against rotation to the sleeve 91 associated with the respective ones of them. The crank arms 101 are secured to and operated by double acting hydraulic cylinder 100, to pivotally rotate the clamping arms 59 and 60 about the shaft 92 into engagement with the rail base 11" or 12" to pre-center the rail sections 11 and 12, as more specifically described below.

Now that the construction of the welding apparatus 10 has been described, its operation may be described as follows. The continuous rail section 11 is positioned within the welding apparatus 10 such that its end is positioned substantially coincident with the centerline of the welding apparatus. The hydraulic cylinder 44 of the upper vertical clamping assembly 21 then is actuated with its maximum stroke, and the electrode 33 via the lever arms 43, 25 and 42, is moved downwardly to engage the rail section 11. As indicated above, the arrangement and operation is such that the running surface 11" of the rail section is fixed or established at a fixed height. Next, the hydraulic cylinder 100 associated with the clamping arm 59 is actuated to pivotally rotate the clamping arm 59 about the shaft 92 into engagement with the rail base 11'''. The rail base 11''' seats within the recess 94 of the base retainer 93 and the rail section 11 is pre-centered as it is pressed against the electrode 33 by the clamping arm 59.

The hydraulic cylinder 86 associated with the clamping arms 55 and 57 next is actuated to pivotally swing these clamping arms 55 and 57 about the shaft 65 into engagement with and as far over the rail head 11' as necessary for the stop 102 on the clamping arm 55 to engage with the running surface 11" of the rail head 11' which, as indicated above, already is fixed or clamped at a pre-established fixed height. The clamping arm 57 has a proximity switch 103 affixed to it which detects the vertical alignment of the rail section 11 at the location of the rail section 11 engaged by the clamping arm 57. Since the clamping arms 55 and 57 are mechanically, rigidly interlinked, and the proximity switch 103 is affixed to the clamping arm 57, the position of the proximity switch 103 with respect to the set-point of the vertical alignment of the rail section 11 is determined.

The centering roller 105 associated with the web clamp assembly 19 is actuated by the hydraulic cylinder 106 to lift the rail section 11, until the proximity switch 103 is actuated. At this time, the rail section 11 at least along its length between the two clamping arms 55 and 57 is aligned in vertical position. The hydraulic cylinder 66 now is actuated, to operate the clamping jaws 55 and 57 to clamp and horizontally and laterally align the end of the rail section 11 as described above. The hydraulic cylinder 48 then is actuated to press the lower electrode 35 of the vertical clamping assembly 21 against the bottom of the rail base 11''', thereby firmly clamping the rail section 11 in the established vertical and lateral aligned positions. The rail section 11 then is webclamped by the web clamping assembly 19 to hold a rail section 11 in correct welding position.

The rail section 12 next is transported into the welding apparatus 10, preferably as far as to abut its end with the end of the rail section 11 which now is clamped and aligned. The hydraulic cylinder 52 then is actuated with its maximum stroke to move the upper electrode 34 downwardly to engage the running surface 12" of the rail section 12, and to thereby vertically clamp the running surface 12" of the rail section 12 at the same fixed height as the running surface 11" of the rail section 11. The hydraulic cylinder 100 associated with the clamping arm 60 is actuated to pivotally rotate the clamping arm 60 about the shaft 92 to engage the rail base 12''' of the rail section 12 and to press the rail section 12 against the electrode 34. As in the case of the rail section 11, the rail section 12 is pre-centered as the rail base 12''' seats in the recess 94 of the base retainer 93 and the rail section 12 is pressed against the electrode 34.

The hydraulic cylinder 96 associated with the clamping arms 56 and 58 now is actuated to pivotally rotate the clamping arms 56 and 58 about the shaft 65, into engagement with and over the rail head 12' of the rail section 12 until the stop 102 on the clamping arm 56 engages the top of the rail head 12' of the rail section 12. Again, since the proximity switch 104 is affixed to the clamping arm 58, and the latter is mechanically interlinked with the clamping arm 56, the position of the proximity switch 104 with respect to the set-point of the vertical alignment of the rail section 12 is determined.

The hydraulic cylinder 107 which actuates the centering roller 108 of the web-clamp assembly then is operated to raise or lift the rail section 12, until the proximity switch 104 is actuated. The rail section 12, like the rail section 11, now is aligned at least along its length between the two clamping arms 56 and 58 in an established vertical position.

Now, the hydraulic cylinder 66 associated with the clamping arms 56 and 58 is actuated to operate the clamping jaws 73 and 74 to clamp and horizontally or laterally align the end of the rail section 12, with the end of the rail section 11. The ends of the rail sections 11 and 12 normally are determined to be laterally aligned visually by the operator, however, sensing means for automatically doing so can be provided. The hydraulic cylinder 99 next is operated to move the electrode 36 into engagement with and to press against the base 12''' of the rail section 12 to clamp the latter in its established vertical and lateral aligned positions. The rail section 12 then is web clamped by the web clamping assembly 20 to hold the rail section 12 in correct welding position.

In the event that the ends of the rail sections 11 and 12 are not properly aligned in their vertical position at the weld joint, the adjusting press or hydraulic cylinder 53 is actuated to adjust the position of the rail section to properly vertically align the ends of the rail sections 11 and 12.

Once the ends of the rail sections 11 and 12 are properly aligned, both vertically and laterally, the welding can start by turning on the current sources 37–40 and by actuating the hydraulic cylinders 17. During the welding operation and during the subsequent cooling time of the welded joint 13, the two rail sections 11 and 12 remain held in mutual alignment by the vertical clamping assemblies 21 and 22, and by the clamping jaws 73 and 74 of the respective ones of the clamping arms 55–58. Disregarding the upsetting force of the hydraulic cylinder 17, tensions which originate from possible formed defects in the longitudinal direction of the rail sections 11 and 12 are kept away from the welded joint 13.

Accordingly, from the above description, it can be seen that the welding apparatus 10 permits the ends of the rail sections to be welded together to be more accurately aligned, both vertically and laterally, regardless of how distorted the rail sections may be along the longitudinal length thereof. The rail sections both are clamped and aligned so that the running surfaces thereof are affixed at the same vertical height, and the lengths thereof, at least between the spaced apart clamping arms 55, 57 and 56, 58, are clamped and laterally aligned so that a good welded joint is provided.

It will thus be seen that the objects set forth above, among those made apparent from the preceding description, are efficiently attained and certain changes may be made in the above construction. Accordingly, it is intended that all matter contained in the above description, or shown in the accompanying drawings, shall be interpreted as illustrative and not in a limiting sense.

Now that the invention has been described, what is claimed as new and desired to be secured by Letters Patent is:

1. Welding apparatus for welding together, in end-to-end relationship to form a continuous rail, rail sections having a base, a web and a head having a running surface and side flanks, said welding apparatus comprising, in combination: a pair of vertical clamping assemblies for vertically aligning the respective ones of a pair of rail sections to be welded together with the running surfaces thereof at the same fixed height, said vertical clamping assemblies engaging the running surface of the rail head of said rail sections to vertically align said rail sections; and a lateral aligning device comprising at least a first pair of clamping arms disposed substantially perpendicular to the longitudinal length of said rail sections and between said vertical clamping assemblies, one of said clamping arms being associated with one of said rail sections, respectively, said first pair of clamping arms at one end thereof being pivotally rotatable about a common axis which is parallel to the longitudinal length of said rail sections into engagement with the respective ones of said rail sections, each of said clamping arms having stop means which engage said running surface of said rail heads of said rail sections to position said clamping arms with respect to said rail sections, said clamping means comprising a pair of clamping jaws which when laterally operated with respect to one another engage the respective ones of the side flanks of said rail heads of said rail sections to clamp said rail heads between them to laterally align the ends of said rail sections to be welded together.

2. The welding apparatus of claim 2, further comprising a hydraulic operating element for operating said pair of clamping jaws to clamp and release said rail heads, said hydraulic operating element being secured to said clamping arm.

3. The welding apparatus of claim 1, further comprising a second pair of clamping arms disposed substantially perpendicular to the longitudinal length of said rail sections and spaced apart on opposite sides, respectively, of said first pair of clamping arms with one of said vertical clamping assemblies being disposed between respective pairs of one of said first pair of clamping arms and one of said second pair of clamping arms.

4. The welding apparatus of claim 3, wherein said first and said second pair of clamping arms at one end thereof are pivotally rotatable about a common axis which is parallel to the longitudinal length of said rail sections into engagement with said rail sections.

5. The welding apparatus of claim 4, wherein one of said first pair of clamping arms and one of said second pair of clamping arms are associated with one of said rail sections, respectively, said associated one of said first and second pairs of clamping arms being mechanically interlinked and pivotally rotated together about said common axis into engagement with said rail section.

6. The welding apparatus of claim 4, wherein each of said clamping arms has a lever arm pivotally affixed to it, the respective ones of said pair of clamping jaws being selectively connectable to said lever arm and to said clamping arm, whereby upon pivotal operation of said lever arm said clamping jaws can be operated to clamp said rail head of said rail section to laterally align the end of said rail section to the left, to the right and toward the plane of symmetry of the rail head.

7. The welding apparatus of claim 6, further comprising a hydraulic operating element secured to said clamping arm and coupled to said lever arm for pivotally rotating said lever arm.

8. The welding apparatus of claim 1, further comprising another pair of clamping arms disposed substantially perpendicular to the longitudinal length of said rail sections and disposed between said vertical clamping assemblies, said other pair of clamping arms at one end thereof being pivotally rotatably about a common axis to engage the rail base of said rail sections to press said rail sections with said vertical clamping assemblies and to pre-center said rail sections with respect to one another and to said welding apparatus.

9. The welding apparatus of claim 1, when said other pair of clamping arms each comprises a base retainer for receiving and retaining therein said rail bases of said rail sections.

10. The welding apparatus of claim 1, wherein said vertical clamping assemblies each comprises an upper electrode electrically connected to supply welding current to said rail sections to effect a weld between them, said upper electrodes being engageable with the running surfaces of said rail sections to vertically align said rail sections.

11. The welding apparatus of claim 10, wherein each of said pair of vertical clamping assemblies further comprises a hydraulic operating element and a plurality of lever arms operatively coupled together and to said hydraulic operating element, said electrode being affixed between the ends of ones of said plurality of lever arms, said hydraulic operating elements being operable to vertically raise and lower said electrode via said plurality of lever arms into engagement with said rail section to vertically align said rail section.

* * * * *

UNITED STATES PATENT OFFICE
CERTIFICATE OF CORRECTION

PATENT NO. : 4,270,036
DATED : May 26, 1981
INVENTOR(S) : Hans-Rudolf Zollinger

It is certified that error appears in the above-identified patent and that said Letters Patent are hereby corrected as shown below:

Column 8, line 21, the word "means" should read --arms--.

Signed and Sealed this

Twenty-ninth Day of June 1982

[SEAL]

Attest:

GERALD J. MOSSINGHOFF

Attesting Officer — Commissioner of Patents and Trademarks